Feb. 10, 1970  LA VERNE FEHLIS ET AL  3,494,358
SELF-TRIGGERED VETERINARY INNOCULATING DEVICE
Filed Dec. 18, 1967  2 Sheets-Sheet 1
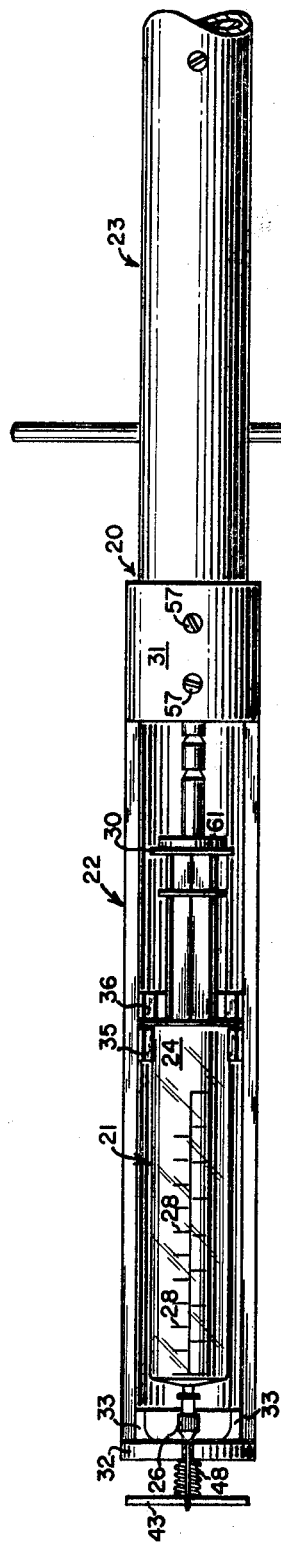
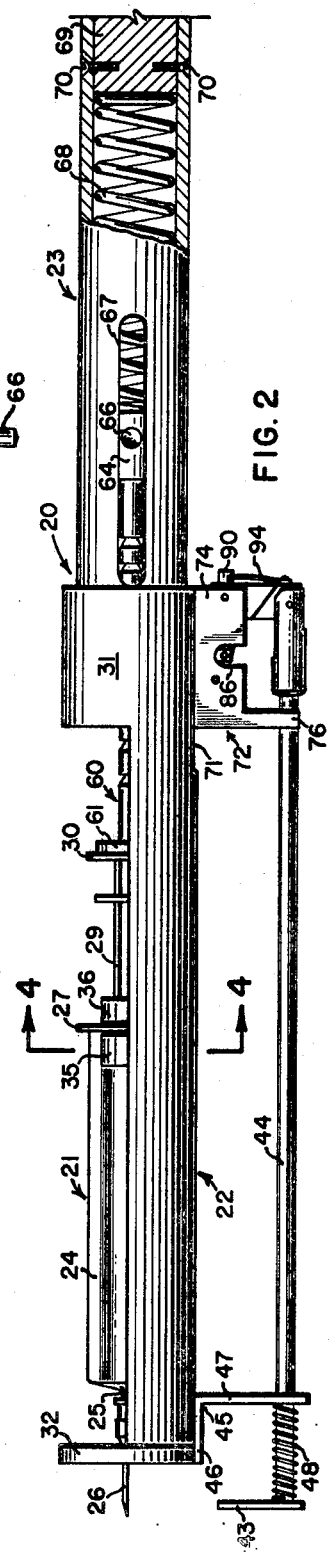
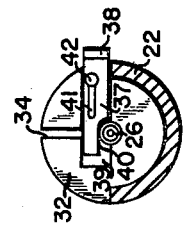
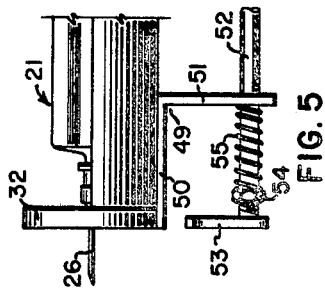
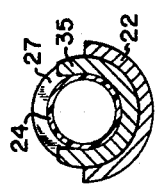
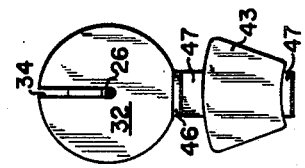
LA VERNE FEHLIS
ROBERT J. GROSSENBACHER
ROYCE N. DUESTERHEFT
INVENTORS
BY *John C. Stahl*
ATTORNEY

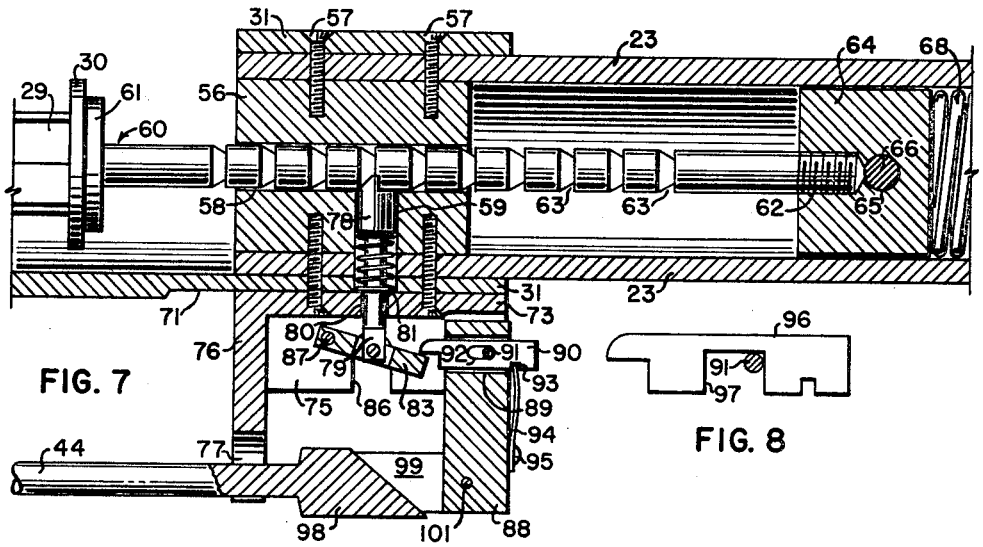
FIG. 7
FIG. 8
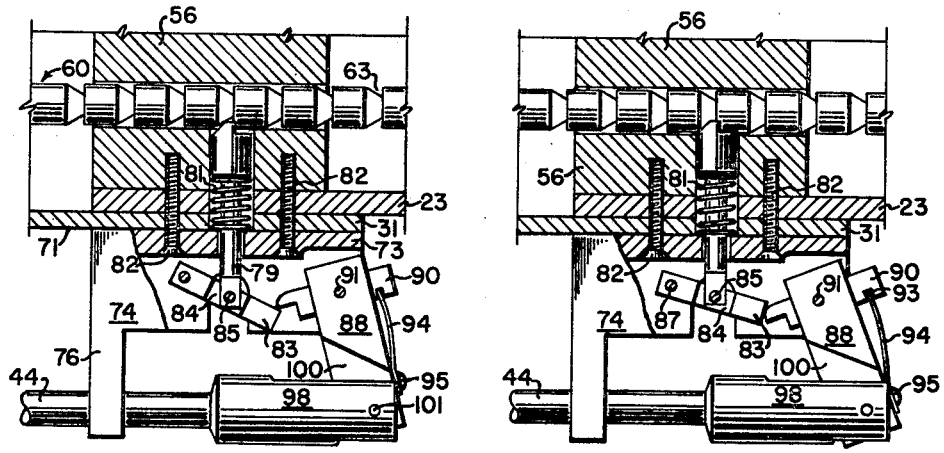
FIG. 9
FIG. 10
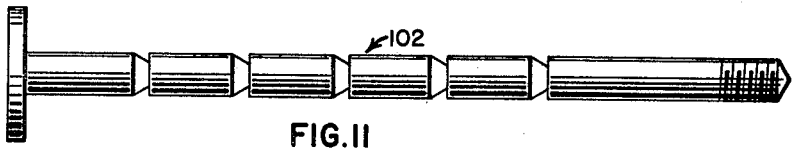
FIG. 11
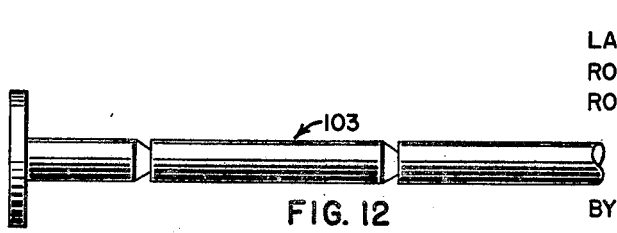
FIG. 12
LA VERNE FEHLIS
ROBERT J. GROSSENBACHER
ROYCE N. DUESTERHEFT
INVENTORS
BY *John C. Stahl*
ATTORNEY

United States Patent Office 3,494,358
Patented Feb. 10, 1970

3,494,358
SELF-TRIGGERED VETERINARY
INOCULATING DEVICE
La Verne Fehlis, 312 Pine St., Lockhart, Tex. 78644;
Robert J. Grossenbacher, Rte. 9, Box 311, San Antonio,
Tex. 78211; and Royce N. Duesterheft, Box 96, La
Coste, Tex. 78039
Filed Dec. 18, 1967, Ser. No. 691,303
Int. Cl. A61m 5/00; A61d 7/00
U.S. Cl. 128—218          5 Claims

ABSTRACT OF THE DISCLOSURE

A device for injecting a predetermined dosage of serum or the like into an animal from a remote location comprising an elongated casing, a syringe of desired capacity detachably secured in said casing, and means whereby the device is activated when the said device is pressed against a selected portion of the animal's body.

---

The present invention relates to an inoculating device and more particularly to such a device where by a predetermined dosage of serum or the like may be injected into an animal.

An object of the present invention is the provision of means for inoculating an animal without penning, tying or putting the animal into a holding chute.

Another object of the invention is to provide such a device whereby an animal may be inoculated from a safe distance.

Still another object is to provide such a device which triggers itself as the needle penetrates the animal's body.

A further object is to provide such a device whereby a selection of proper needle size and length permits intramuscular or subcutaneous injection, in series, and in predetermined doses.

A final object is to provide such a device which is inexpensive to manufacture, capable of mass production techniques, and universal in its adaptability.

Other objects and features of the invention will become apparent to those skilled in the art as the disclosure is made in the following detailed description of preferred embodiments of the invention as illustrated in the accompanying sheets of drawing in which:

FIG. 1 is a fragmentary, top plan view of the preferred embodiment of the subject invention.

FIG. 2 is a fragmentary, side elevational view, partly broken away and partly in section, of the embodiment of FIG. 1.

FIG. 3 is a front elevational view of the embodiments of FIGS. 1 and 2.

FIG. 4 is a vertical sectional view, taken on the line 4—4 of FIG. 2 looking in the direction of the arrows.

FIG. 5 is a fragmentary, side elevational view of the foremost portion of the inoculating device showing a modification thereto.

FIG. 6 is a vertical sectional view, transverse to the longitudinal axis and taken through the foremost portion of the device, showing one embodiment of securing means for the syringe.

FIG. 7 is a fragmentary, greatly enlarged, side elevational view, partly broken away and partly in section, through the medial portion of the subject invention.

FIG. 8 is an enlarged, side elevational view of a modified sear.

FIG. 9 is a fragmentary, greatly enlarged, side elevational view, partly broken away and partly in section, of the medial portion of the subject invention, showing the relationship of the parts just prior to triggering the device.

FIG. 10 is a fragmentary, greatly enlarged, side elevational view, partly broken away and partly in section, of the medial portion of the subject invention, showing the relationship of the parts during the recocking cycle.

FIG. 11 is a greatly enlarged, side elevational view of another pin utilized in the practice of the subject invention.

FIG. 12 is a greatly enlarged, side elevational view of still another pin utilized in the practice of the invention.

Referring now to the drawings, wherein like reference characters designate like or corresponding parts throughout the several views, there is shown in FIGS. 1 and 2 an inoculating device 20 consisting, in general, of syringe 21 which is detachably secured in the fore end of member 22. Handle 23 of desired length may be secured in the rear end of member 22 in a manner hereinafter to be described or member 22 may be of desired length for grasping the said device.

Syringe 21, of desired volume and length, is of the type such as is well-known in the art and consists of barrel 24 which terminates forwardly in an integrally formed and restricted neck 25 to which needle 26 is detachably secured; as best seen in FIGS. 2 and 4 of the drawings, barrel 24 terminates rearwardly in an integrally formed and transversely extending ring 27. Graduated markings 28 are desirably provided on barrel 24. Piston 29 inserts into barrel 24 in tight fitting relationship and the fore end thereof, relative to markings 28, indicates the quantity of serum or the like remaining in the barrel. The said piston terminates rearwardly in an integrally formed and transversely extending disc 30.

The medial portion of member 22 is preferably U-shaped in vertical, transverse section; said member 22 terminates rearwardly in integrally formed, tubular portion 31. As heretofore mentioned, said tubular portion 31 may be of any desired length and may serve as a handle. Plate 32 (see FIG. 3) is secured in or to the fore end of member 22; more specifically, plate 32 includes an integrally formed, rearwardly extending and essentially U-shaped base 33 which inserts and is secured in the fore end of member 22 in a conventional manner. A longitudinally and vertically extending, upwardly opening slot 34 in plate 32 accommodates needle 26, said slot terminates slightly downward of the center of said plate and supports needle 26.

As best seen in FIGS. 2 and 4 of the drawings, first and second transversely extending, U-shaped members 35–36 secure syringe 21 in member 22; more specifically, members 35, 36 are conventionally secured in spaced relationship in the medial portion of member 22 to receive ring 27 of the syringe therebetween. Member 35, positioned forwardly of ring 27, additionally supports the said barrel. Ring 27 bears against the inner surface of member 22 with the laterally extending legs of members 35, 36 terminating upwardly in proximity to the upper surface of barrel 24 of the said syringe. It is to be understood that a U-shaped (not shown) may be conventionally secured in member 22 in proximity to the fore end of barrel 24 to additionally support the same.

Referring now to FIG. 6 of the drawings, there is shown one embodiment of locking means whereby needle 26 may be secured in slot 34. More particularly, said locking means is L-shaped in plan, consisting of base 37 which terminates outwardly in tab 38 turned perpendicularly rearward. Base 37 inserts into groove 39 in the rear surface of plate 32. The lower, inner edge of base 37 is removed, indicated by reference numeral 40, to pass over a selected portion of needle 26. Base 37 is retained in groove 39 by means of an elongated slot 41 through which pin 42 passes and inserts into plate 32. When base 37 is pushed to the left, as viewed in FIG. 6, needle 26 is secured in slot 34; when base 37 is pushed to the limit of travel in the opposite direction, base 37 clears needle 26 and the said needle may be passed upwardly through slot 34. It is to be understood that one end of a strap (not shown) may be hingedly secured to one side of member 22; said strap may be passed over barrel 24 and the opposite end secured to a coacting fastening member secured to the opposite side of the said member 22.

Vertically and transversely extending actuating plate 43 of desired configuration is normally in extended condition, forward of the vertical plane containing plate 32 and approximately vertically below the point of needle 26 as viewed in FIGS. 1 and 2 of the drawings. Plate 43 is conventionally secured to one end of an essentially horizontally extending rod 44. L-shaped bracket 45 consists of legs 46–47; leg 46 is conventionally secured to the foremost, undersurface of member 22 with leg 47 extending downwardly. A bore (not shown) in proximity to the lower end of leg 47 accommodates rod 44. Spring 48 carried on rod 44 intermediate plate 43 and leg 47 maintains actuating plate 43 in extended condition.

In the embodiment of FIG. 5, bracket 49 consists of legs 50–51 of approximately equal length. Leg 50 is conventionally secured to the foremost, undersurface of member 22; leg 51 includes a bore (not shown) in proximity to the lower end thereof which accommodates rod 52. In such embodiment. the foremost end of rod 52 is threaded to receive actuating plate 53 and nut 54. Spring 55 carried by rod 52 bears against leg 51 and nut 54, respectively. Such construction permits adjustment of the spring tension on actuating plate 53.

There is shown in FIGS. 7–10 of the drawings means whereby a predetermined dosage of serum or the like may be injected into an animal. One end of handle 23 inserts into tubular portion 31 (see FIGS. 1 and 7) with cylinder 56 secured in the bore thereof as by machine screws 57 or the like. An axial bore 58 in cylinder 56 communicates with vertically and radially extending bore 59 of reduced diameter. Pin 60 terminates forwardly in transversely extending disc 61 or the like; the shank passes through bore 58 and terminates rearwardly in threaded portion 62. The shank of pin 60 further includes a predetermined number and arrangement of notches 63, hereinafter to be more fully described in connection with FIGS. 11 and 12. Cylinder 64 slidably inserts in bore of handle 23; transversely extending bore 65 in the said cylinder accommodates handle 66 which passes through horizontal, aligned, elongated slots 67 in the sides of handle 23. Threaded portion 62 screws into cylinder 64 with the end thereof bearing against the medial portion of handle 66 securing the same in position. One end of spring 68 bears against cylinder 64 heretofore mentioned with the opposite end bearing against cylinder 69 fixedly secured in handle 23 as by means of machine screws 70 or the like.

As best seen in FIG. 7, the rearmost, undersurface of member 22 includes flat 71 which accommodates housing 72. Preferably, housing 72 is integrally formed and consists of longitudinally extending base 73, spaced and perpendicularly downward depending flanges 74–75 which parts terminate forwardly in a downwardly depending leg 76; a downwardly opening slot 77 in leg 76 accommodates rod 44 heretofore mentioned. Pin 78 passes upwardly through bore 59 and engages a selected notch 63 on pin 60; downwardly pin 78 includes a reduced portion 79 (see FIG. 9) which passes through an aligned bore 80 in base 73. Spring 81 carried on reduced portion 79 bears against the shoulder of said reduced portion and the upper surface of base 73, respectively. Machine screws 82 (see FIG. 9) pass upwardly through aligned bores in base 73 tubular portion 31, handle 23 and thread into cylinder 56.

It is to be understood that housing 72 may consist of a downwardly opening channel (not shown), the fore end of which may either remain open or be closed. In the latter modification, a cap may be secured therein in a conventional manner or a bracket may butt the fore end of the said channel and be secured to the undersurface of member 22.

Rectangular bar 83 which is positioned between flanges 74, 75 includes a vertically and longitudinally extending, elongated slot 84 in the approximate center thereof into which the lower end of reduced portion 79 passes and pivotally connects by means of transversely extending pin 85 passing through aligned bores. An inverted, U-shaped cutout 86 (see FIG. 2) is provided in flanges 74, 75 to provide access to pin 85. The foremost end of bar 83 pivotally connects by means of pin 87 to flanges 74, 75.

Actuating arm 88 includes a rectangular slot 89 in proximity to the top thereof, which slot passes longitudinally therethrough. Sear 90 slidably inserts in slot 89. Transversely extending pin 91 passes through elongated slot 92 in sear 90 and through aligned bores in flanges 74, 75. Groove 93 in the rear, lower surface of sear 90 accommodates one end of leaf spring 94; the said spring 94 is secured downwardly to the rear surface of arm 88 by means of screw 95 or the like.

In the modification of FIG. 8, sear 96 includes a transversely extending slot 97 in the lower surface, said slot opens downwardly and accommodates pin 91 heretofore mentioned.

Rearwardly, rod 44 is bifurcated, indicated by reference numerals 98–99, which parts pass outwardly of the lower, reduced portion 100 of actuating arm 88 and pivotally connect thereto by means of pin 101 or the like.

It is to be understood that the invention is not to be restricted solely to the use of a pin 60 having a plurality of equally spaced notches. In FIG. 7 of the drawings, for example, ten equally spaced notches are provided in the shank of pin 60. Such pin is especially useful in combination with a syringe of twenty cubic centimeter capacity and wherein up to ten shots of two cubic centimeters each may successively be given. In the embodiment of FIG. 11, pin 102 may be used with a twenty cubic centimeter syringe to provide shots of four cubic centimeters each. Alternatively, when pin 102 is used with a ten cubic centimeter syringe, injections of two cubic centimeters each may be given. Pin 103 of FIG. 12, which includes two notches, when used with a syringe of ten cubic centimeter capacity, permits two shots of five cubic centimeters each.

Prior to use, the rancher or farmer will select a pin 60, 102 or 103 which in combination with a selected syringe 21 will provide the desired innoculation. Before inserting syringe 21 in member 22, the user first pulls handle 66 rearwardly so that disc 61 is properly positioned relative to the amount of serum contained in the barrel 24 of the syringe. Normally, the user fills the syringe with the required amount of serum to give a predetermined number of shots. For example, if the user desires to inoculate each of four animals with two cubic centimeters of serum or the like, using a twenty cubic centimeter syringe, only eight cubic centimeters of serum is drawn into barrel 24 in a conventional manner. Handle 66 is pulled rearwardly four notches, indicated audibly by four separate clicks as pin 78 engages the first four notches, successively. At such time syringe 21 is secured in member 22 in the manner heretofore described with disc 30 of the syringe abutting disc 61.

Thereafter, when the user presses activating plate 43 against the animal, needle 26 penetrates the animal's body and the predetermined dosage of serum is injected. More particularly, rod 44 connecting to plate 43 forces arm 88 rearwardly. As best seen in FIG. 9, as arm 88 pivots about pin 91, sear 90 forces bar 83 to pivot in a clockwise direction about pin 87 whereby pin 78 is disengaged from the corresponding notch in pin 60. Spring 68 bearing against cylinder 64 forces pin 60 forward until stopped by pin 78 engaging the next, successive notch in the said pin 60. Piston 29 of the syringe is forced forward in barrel 24 thereby injecting the desired dosage of serum through needle 26 into the animal.

Although plate 43 is still pressed against the animal's body, inoculating device 20 is immediately prepared for the succeeding shot. As viewed in FIG. 9 of the drawings, pin 78 has disengaged from notch 63 in pin 60; at such time, pin 60 rides forward in bore 58 and sear 90 continues to ride downward and rearward over the upper, rear surface of bar 83 until the said sear clears the rear, upper edge thereof. As shown in FIG. 10, pin 78 immediately engages the succeeding notch in pin 60 causing bar 83 to be pulled upward by the action of spring 81. The foremost, curved surface of sear 90, bearing against the rear surface of bar 83, forces sear 90 rearwardly in slot 89 against the spring tension of spring 94 until the said foremost end of the sear rides upwardly and over the rear, upper edge of bar 83 and assumes the position of FIG. 7 of the drawings. When needle 26 is withdrawn from the animal's body, activating plate 43 assumes the extended position and device 20 is ready for inoculating another animal.

An absorbent pad (not shown) may be conventionally secured to the foremost surface of plates 43, 53; when such pad is saturated with a dye or other coloring matter, such dye is applied to the animal during inoculation, indicating which animals have been given shots.

It should be understood, of course, that the foregoing disclosure relates to only preferred embodiments of the invention and that it is intended to cover all changes and modifications of the examples of the invention herein chosen for the purposes of the discolsure, which do not constitute departures from the spirit and scope of the invention.

What is claimed is:
1. An inoculating device comprising
an elongated base,
a transversely and vertically extending end plate secured to said base,
a vertically and longitudinally extending slot in said end plate,
a syringe detachably secured in the fore end of said base,
said syringe consisting of a barrel, a needle secured to said barrel, and a piston slidably inserting in said barrel,
said needle extending forwardly through said slot,
an actuating plate extending forwardly of said end plate,
said base terminating rearwardly in a tubular portion,
first, second and third cylinders mounted in said tubular portion,
said first cylinder fixedly secured in said tubular portion and including an axial bore and a radially extending bore communicating therewith,
a longitudinally extending pin passing through said axial bore,
said longitudinally extending pin terminating forwardly in a transversely extending disc which is adjusted to bear against said piston of said syringe,
said longitudinally extending pin including a plurality of notches and connected rearwardly to said second cylinder which slidably inserts in said tubular portion,
said third cylinder fixedly secured in said tubular portion,
a spring intermediate said second and third cylinders,
a pin in said radially extending bore which is adapted to engage a selected notch in said longitudinally extending pin, and
means connected to said pin and said actuating plate whereby the piston is forced forwardly in said syringe when said actuating plate is pressed against and said needle penetrates an animal's body.

2. The invention of claim 1 including means on said end plate to secure said needle in said slot.

3. The invention of claim 1 including means to vary tension on said actuating plate.

4. The invention of claim 1 including marking means secured to said actuating plate whereby a visible mark is applied to an animal during inoculation.

5. The invention of claim 1 further including a housing mounted on said base, a bar pivotally mounted in said housing, an actuating arm pivotally connected at one end to said housing, the other end of said actuating arm connected to said actuating plate, a sear mounted in said actuating arm, in one position the said sear engages said bar and retracts said pin from said selected notch in said longitudinally extending pin, and in a second position the said sear is repositioned relative to said bar preparatory to another firing cycle.

References Cited

UNITED STATES PATENTS

| | | |
|---|---|---|
| 2,800,903 | 7/1957 | Smoot. |
| 3,006,649 | 10/1961 | Gesick et al. ____ 128—216 XR |
| 3,114,370 | 12/1963 | Kayler. |
| 3,430,626 | 3/1969 | Bergman _____ 128—218 |

RICHARD A. GAUDET, Primary Examiner

MARTIN F. MAJESTIC, Assistant Examiner